Dec. 20, 1966 J. GIGER 3,292,242

PROCESS FOR THE PRODUCTION OF A SUPERCONDUCTIVE MEMBER

Filed Dec. 19, 1963 3 Sheets-Sheet 1

INVENTOR

Johannes Giger

BY Pierce, Scheffler & Parker

ATTORNEYS

Dec. 20, 1966 J. GIGER 3,292,242

PROCESS FOR THE PRODUCTION OF A SUPERCONDUCTIVE MEMBER

Filed Dec. 19, 1963 3 Sheets-Sheet 2

INVENTOR
Johannes Giger
BY Pierce, Scheffler & Parker
ATTORNEYS

Dec. 20, 1966 J. GIGER 3,292,242

PROCESS FOR THE PRODUCTION OF A SUPERCONDUCTIVE MEMBER

Filed Dec. 19, 1963 3 Sheets-Sheet 3

INVENTOR

Johannes Giger

BY Pierce, Scheffler & Parker

ATTORNEYS

United States Patent Office 3,292,242
Patented Dec. 20, 1966

3,292,242

PROCESS FOR THE PRODUCTION OF A SUPERCONDUCTIVE MEMBER

Johannes Giger, Baden, Aargau, Switzerland, assignor to Aktiengesellschaft Brown, Boveri & Cie, Baden, Switzerland, a joint-stock company Filed Dec. 19, 1963, Ser. No. 331,698
Claims priority, application Switzerland, Feb. 4, 1963, 1,342/63
1 Claim. (Cl. 29—155.5)

The invention relates to a process for producing a superconductive member, more particularly a magnetically hard superconductor, with a surface layer of a superconductive alloy and/or compound with at least two components. The term "superconductor" is that which has come to be applied to certain electrical conductor material which, when maintained below particular critical temperatures in the vicinity of absolute zero, exhibit no measurable electrical resistance. Above that critical temperature there is a quick transition from practically zero electrical resistance to its normal value. Moreover, a magnetic field is often associated with the superconductor which has the effect of shifting the critical temperature at which the change to or from zero electrical resistance occurs.

It is known that considerable technological difficulties are involved in the production of magnetically hard superconductive wires for winding electromagnets. An alloy which is suitable in that it can be mechanically processed consists of niobium and zirconium, and can be made into wires which can easily be wound into coils. However, the alloy exhibits the great disadvantage of losing a large amount of its superconductive character even at about 60K oe. On the contrary, niobium-tin and vanadium-gallium alloys remain superconductive in even relatively strong magnetic fields. However, these alloys are exceptionally hard and brittle, and are accordingly very difficult to deform.

In the known Kunzler process, a small niobium tube is filled with fine-grained powder of niobium and tin, and drawn to a smaller diameter. Wire processed in this way is easily bent, and can be made into the desired geometrical shape, for example a coil. The wire is now annealed for several hours in a neutral atmosphere at about 1000° C., so that the niobium and tin forming the core combine to make the desired magnetically hard superconductor. However the wire exhibits the disadvantage of being very brittle after annealing and being incapable of withstanding mechanical stresses of any kind, since otherwise the filamentary or superficial regions responsible for conduction in magnetically hard superconductors will be broken. A further disadvantage resides in that only the core of the wire consists of superconductive material, with the result that individual pieces of wire cannot be electrically connected in the region of strong magnetic fields. In addition, the process only enables wires of limited length to be produced.

A process has furthermore been proposed for producing an article with a surface layer of a superconductive alloy with at least two components such as niobium and tin. In this process, the article is made of the component of highest melting point, and the other components of the alloy are diffused into at least part of its surface at high temperature. The process accordingly limits the choice of material for the article to that one of the components of the superconductive alloy which has the highest melting point. Thus, if the superconductive coating is a niobium-tin alloy the article consists of niobium, a relatively expensive material. In addition, diffusing the second and any further components into the surface of the article is awkward, since the mechanical properties of the solid, tough and flexible first component are lost when the components being diffused in reach the core of the article.

The present invention avoids the disadvantages of known and proposed processes. The process according to the invention resides in that a basic carrier member made of a material which is passive as regards superconduction, i.e. the basic member does not exhibit any superconductive effect, and having a diffusion-resisting surface which is at least partially covered with the components of the superconductive alloy and/or compound, and in that the components are caused to diffuse mutually by thermal treatment.

The invention is based on a realization that a superconductive surface layer can be applied to a basic member without the material of the basic member having to consist of the component of the superconductive alloy with the highest melting point, and without the material of the basic member having to be a component of the superconductive alloy at all. Even in the latter case, the material of the basic member need not exhibit the highest melting point of all the materials used in building up the superconductive member.

In this connection it is a prerequisite that the passive, i.e. non-superconductive basic member and the superconductive surface layer shall not display any mutual diffusion, that is to say that the basic member shall comprise a diffusion-inhibiting surface. If the basic member, consisting for example, of a pure metal, participated actively in the superconduction, the superconductive properties would be perceptibly impaired, if not entirely destroyed.

A reaction between the basic member and the first applied component of the superconductive alloy or the active superconductive surface may be counteracted in various ways. Firstly, a knowledge of diffusion mechanisms may be used in order to select for the basic member a metal which in itself can be metallurgically mixed to a limited or scarcely noticeable extent with the first applied component of the superconductive alloy or with the active superconductive surface layer. A more expedient way of counteracting the reaction between the metal of the basic member and the superconductive alloy is to coat the metal of the basic member with a diffusion-inhibiting intermediate layer. Such intermediate layers prevent any reaction between the metal of the basic member and the components of the superconductive alloy both while the latter is being applied and during the subsequent diffusion procedure. Finally, it is also possible to make the basic member of a non-metallic material, and cover the latter with the components of the superconductive alloy and/or compound.

The process according to the invention makes it possible to select for the basic member a material which exhibits the desired advantageous mechanical properties and sufficient capacity for deformation. The applied superconductive surface layer does not impair these properties, or at most does so as to an insignificant extent. In addition, the use of a material which is passive as regards superconduction for the basic member considerably cheapens the superconductive member.

The invention will be more precisely explained with the aid of a few examples of execution and the drawings.

In the first example of execution, the production of a flexible wire with a superconductive surface layer of $Nb_3Sn$ will be described. A chromium-nickel wire with a diameter of 0.5 mm. is used as the basic member. This wire is to be homogeneously and relatively heavily oxidized over its whole surface, as is the case with normal commercial chromium-nickel wires for winding electrical resistances. This wire, having been degreased and annealed, is vapour-coated with the components of the superconductive alloy, i.e. niobium and tin.

Figure 1:
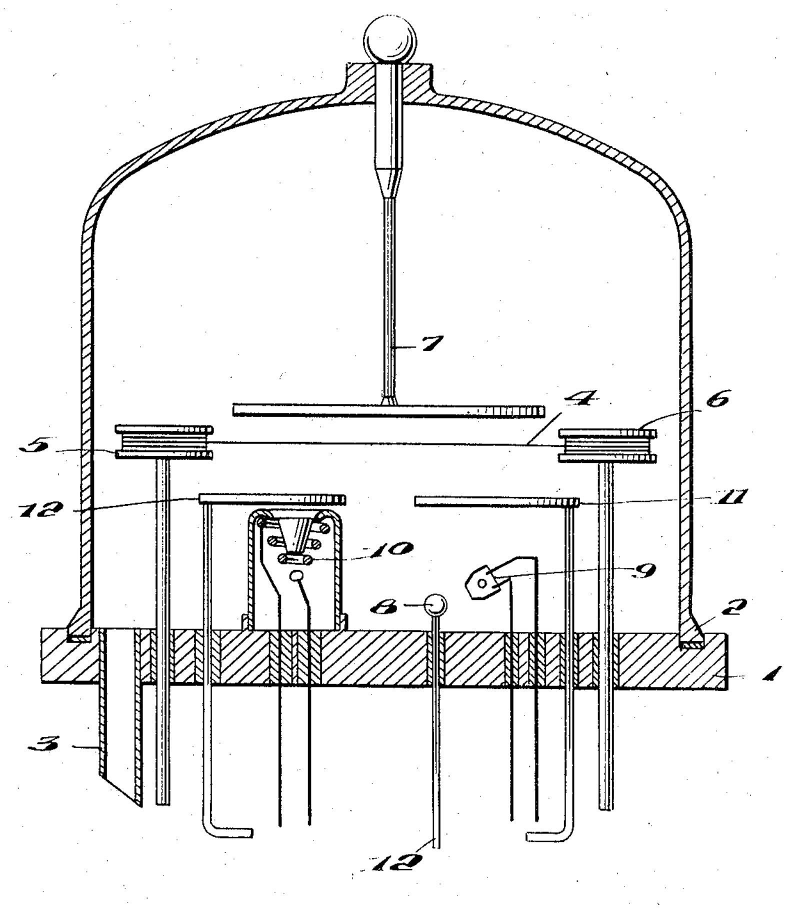
FIG. 1 is a vertical sectional view of one embodiment of the invention wherein the superconductor material is deposited on a wire carrier base by means of a vapor coating technique.

FIGURE 1 shows in principle the construction of a suitable vapour-coating plant. This vapour-coating plant comprises in the first place a base-plate 1 provided with the required lead-throughs, and a vacuum bell 2. The vacuum connection is designated by 3. The Cr-Ni wire 4 can be wound from the externally driven supply reel 5 on to the similarly driven take-up reel 6. The driving device is not shown in the figure. Furthermore, the drive is advantageously so designed that the reels also rotate continuously about an axis perpendicular to the driving axis shown, with the result that the longitudinal movement of the wire 4 is supplemented by a rotary movement about its own axis.

The vapour-coating plant furthermore embraces a glow-discharge electrode 7 connected to a high-voltage source, a first vapour-coating source 8 with a heater device 9, and a heater device 10 for receiving a crucible with a second vapour-coating source. Both sources can be covered with the rotatably arranged shutters 11 and 12.

The vapour-coating procedure is now carried out as follows, for example: The whole length of the wire 4 is subjected to a glow-discharge by means of the electrode 7 in one run through for residual cleaning purposes. The first metal in the form of niobium is then vapour-coated on to the densely oxidized surface of the wire. The vapour-coating source, consisting of a small sphere of niobium, is heated for this purpose, for example at the electron focal point of the device 9, as indicated in the figure and shutter 11 is withdrawn. The vapour-coating source may also be heated in an electron stream. After the surface of the whole length of wire is covered with niobium, the vapour-coating source 8 is then recovered by means of the shutter 11, and heating by 9 of the source 8 is interrupted. A layer of tin is now vapour-coated on to the wire on its next run through. For this purpose, the tin is heated up in a crucible made of $Al_2O_3$ which fits exactly into a cup established by the resistive heating spiral of the heater device 10. The heater device 10 is also provided with a heat-radiation screen, a vapour-stream director cylinder and a drip-trap. After the shutter 12 has been turned away, a layer of metallic tin is applied to the wire as it runs through, that is to say to the niobium layer on the surface of the wire. The vapour-coated niobium and tin layers are intended to be from about 0.005 to 0.07 mm. thick.

If the wire is given a further glow-discharge treatment, further layers of niobium and tin may now be alternately vapour-coated in the same way. The last layer applied should be of tin, and should be twice as thick as the remaining layers. The last layer of tin is then advantageously melted together and sintered together on the surface by means of a run-through furnace in the same high vacuum chamber. The outermost layer of tin forms a mechanically firm and cohesive metal skin after this thermal treatment, enabling the wire to be mechanically handled and, for example, wound on to a spool member.

Mutual diffusion of niobium and tin in the layers vapour-coated on to the wire takes place after a member has been wound with the wire. The basic member, in the present case the chromium-nickel wire, is advantageously used as an electrical heating conductor in order to produce the heat required for diffusion purposes. The wire is heated in this way to a temperature of, for example, about 850° C., and kept at this temperature for about 15 minutes, heating being carried out in a vacuum or in an atmosphere of protective gas. The active metals niobium and tin or their alloy or compound are effectively prevented from diffusing into the chromium-nickel wire, which is passive as regards super-conduction, by the layer of oxide on the surface of the chromium-nickel wire.

In another method of carrying out the process described, the basic member is vapour-coated in alloyed fashion, the vapour-coating plant comprising a plurality of vapour-coating sources in each of which one component of the alloy and/or compound to be applied is vaporized sequentially. Finally, a superconductive alloy as such may be applied by vapour-coating.

A second example of execution of the process according to the invention is described hereinafter with the aid of FIGURES 2 to 4, the basic member being covered with one component of the superconductive alloy and/or compound by plating.

Figure 2:
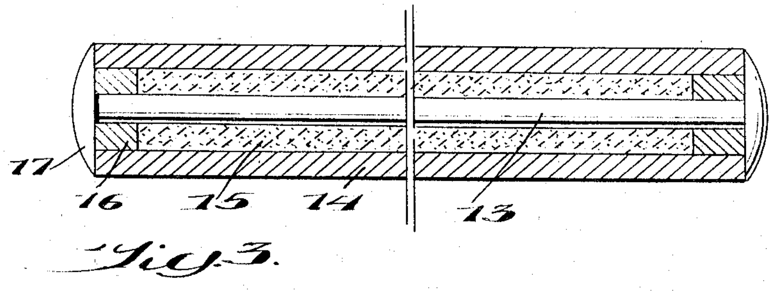
FIGS. 2 to 4 illustrate another embodiment of the invention wherein the superconductor material takes the form of tubes which are then fixed to the wire carrier base by means of a drawing technique.

In FIGURE 2, a piece of chromium-nickel wire about 500 mm. long and about 2 mm. in diameter is designated by 13. This piece of wire is covered with a small tube of niobium 14, which is of the same length as the chromium-nickel wire, and has an internal diameter of 3.5 mm. and a wall thickness of about 1.5 mm. The intermediate space between the surface of the wire and the internal wall of the small tube is accordingly about 1.5 mm. This intermediate space is now filled, completely and without any gaps, with a ceramic powder 15 consisting of magnesia dust or other extremely fine ceramic substances, so that the chromium-nickel wire becomes exactly concentric over its whole length with the small tube of niobium. Both ends of the wire arrangement are now closed with niobium plugs 16 and welded.

Figure 3:
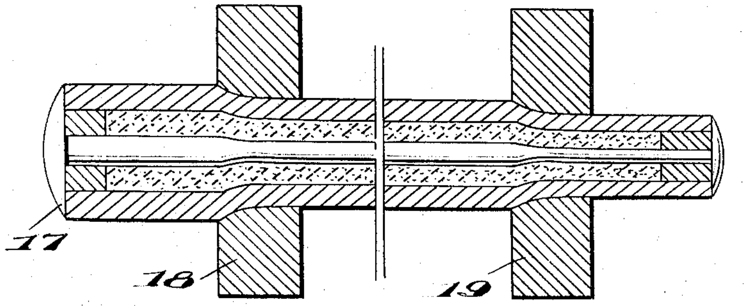

As shown in FIGURES 3, the wire arrangement 17 illustrated in FIGURE 2 is drawn down to extremely small diameters of about 0.1 to 0.5 mm. on a precision drawing mechanism, for example by two dies 18 and 19. In a further step of the process, the drawn wire comprising a surface of niobium is covered with tin, the second component of the superconductive alloy. This is done, for example, by the process described in the first example of execution. After the layer of tin has been vapour-coated on to it, the wire exhibits the structure shown in FIGURE 4, namely the topmost layer in the form of the layer of tin 20, beneath it the layer of niobium 21 in the form of the drawn small tube of niobium, and the basic member in the form of the chromium-nickel wire 23, which is separated from the layer of niobium 21 by the layer 22 of ceramic powder. As already described, a plurality of layers of tin and niobium may also be alternately applied by vapour-coating, and in the present example the first and last layers to be applied by vapour-coating are of tin.

Figure 4:
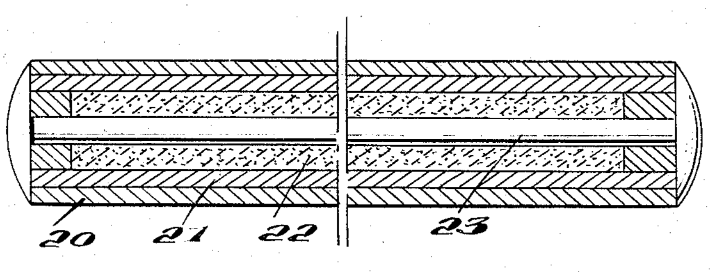

The last step of the process takes place after the member provided has been covered with the wire shown in FIGURE 4, and resides in carrying out diffusion, for which purpose the chromium-nickel wire used as the basic member is again advantageously employed as an electrical heating conductor. Further possible methods of covering the basic member with at least one component of the superconductive alloy and/or compound, are, for example, application from the liquid phase, application by cathode-atomization, and spraying on. There are also numerous ways of covering the basic member with a diffusion-resistant intermediate layer. Thus, an adhesive layer of glass, enamel or ceramic may be applied to the basic member. For example, a basic member in the form of a tungsten filament is drawn through a bath of $SiO_2$ and stripped off after passing through, or the filament is heated to from about 1000° to 1500° C. by the action of a high-frequency field or by passing current directly through it in order to sinter or melt the layers of $SiO_2$. The components of the superconductive alloy are thereupon applied and diffused in by a process which has been described, for example by vapour-coating with niobium and tin and subsequent diffusion by passing current through the tungsten filament.

It is also possible to wind the basic member with at least one component of the superconductive alloy and/or compound in wire or strip form. Various examples of execution of this process are shown in FIGURES 5 to 8.

Figure 5:
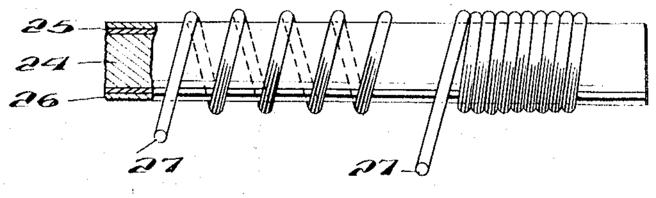
FIGS. 5 to 8 illustrate another embodiment of the invention wherein the superconductor material is in wire or strip form and is applied helically to the wire carrier base.

In the example of execution shown in FIGURE 5, the basic member 24 in wire form is covered with a diffusion-resistant intermediate layer 25, to which is applied a surface layer 26, for example by vapour-coating. The wire thus prepared is wound with a spiral of niobium wire 27, the individual turns being wound at a definite distance from each other as shown at the left or adjacent to one another, as shown at the right according to the quantity in which niobium is to be applied to the wire as compared to the quantity of tin. For example, an oxidized chromium-nickel wire is coated with a layer of tin 0.3 mm. thick, and continuously wound with a niobium wire 0.3 mm. in diameter, turn to turn.

Figure 6:
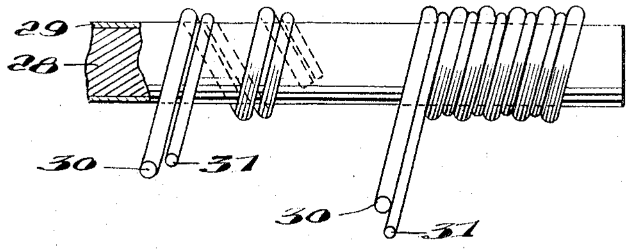

A further example is shown in FIGURE 6. In this case, the basic member 28, in wire form and covered with a diffusion-resistant intermediate layer 29, is simultaneously wound with a fine niobium wire 30 and a tin wire 31 in spiral fashion, the individual turns being spaced apart, or close together, and the wire dimensions being adapted to the desired superconductive layer.

Figure 7:
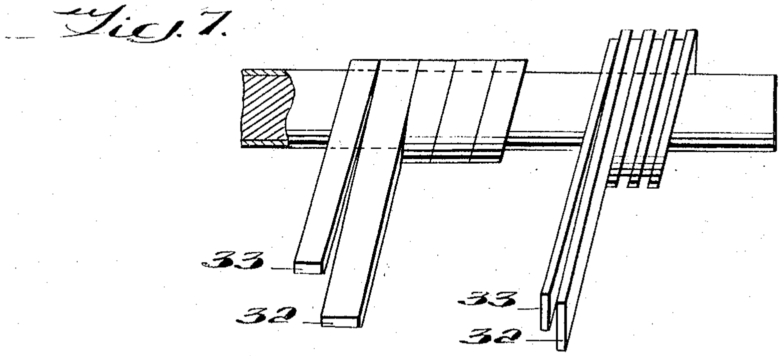

Instead of the components of the superconductive alloy being wound on to the basic member in wire form, they may also be applied in strip form. FIGURE 7 illustrates the basic member being wound with a niobium strip 32 and a tin strip 33, and these strips may be wound on either flat as shown at the left or on edge as shown at the right.

Figure 8:
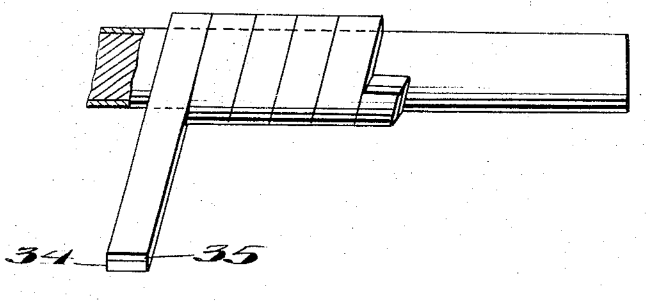

Furthermore, the basic member may, as shown in FIGURE 8, be wound with a strip consisting of a strip of niobium 34 previously plated with a layer of tin 35.

In the foregoing examples, the basic member is wound with a single-stratum layer of wires or strips of the components of the superconductive alloy and/or compound. Instead of this, a plurality of strata of niobium of tin wire may also be wound onto the basic member when corresponding wire dimensions are encountered.

After a basic member in wire form has been wound, it is expedient to draw the composite wire to a smaller diameter, and then to diffuse the components of the superconductive alloy into one another in the manner already described.

If at least one of the components of the superconductive alloy and/or compound is present in wire or strip form, a basic member in the form of a wire may also be covered in the longitudinal direction with the wire or strip of the component, and drawn to a smaller diameter by means of a straightening comb and drawing nozzles. In order that the individual wires, which may also consist by turns of the various components of the superconductive alloy, may be uniformly held fast while drawing is in progress against the surface of the basic member covered with a diffusion-inhibiting intermediate layer, it is expedient to coat the basic member before the wires are applied with a thin layer of metal, for example tin if the superconductive alloy consists of niobium and tin. After being drawn for the first time, the combination of the individual active wires pressed against the basic member is briefly heated to the melting point of tin. This ensures that the individual wires are held sufficiently fast for a further drawing procedure. Instead of this, the composite wire, after having been drawn for the first time, may be externally coated with a thin layer of tin and briefly heated to the melting point of tin.

In the examples of execution so far described of the process according to the invention, a metallic material is used for the basic member, and is covered with a diffusion-resistant intermediate layer. Particular significance is attached to the use of a non-metallic basic member covered with a superconductive surface layer.

Magnetically hard superconductors do not exhibit a superconductive effect throughout their volume, but only in thin filament- or surface-like parts. Therefore, when a hard superconductor has alternating current flowing through it, or is exposed to an alternating magnetic field, loss-free electric currents flow only in the filaments, while eddy currents with accompanying losses are set up in the remaining non-superconductive parts. Because of the heat losses produced by the eddy currents, a hard superconductor therefore immediately reverts to the normally conductive state in an alternating-current circuit.

If the components of the superconductive alloy and/or compound are now applied in accordance with the invention in thin layers to a non-metallic basic member, for example by vapour-coating, and are diffused into one another by thermal treatment, the superconductive surface layer which is formed can also have alternating currents flowing in it without any eddy currents being set up in the basic member.

A filament or strip of quartz is, for example, suitable for a non-metallic basic member. A quartz filament with a diameter of up to 0.3 mm. or a quartz strip with a thickness of up to 0.3 mm. can be wound in the cold state on to a mandrel of at least 80 mm. diameter. The components of the superconductive layer, for example niobium and tin, are vapour-coated, sprayed or applied by electrolysis in thin layers on to such a basic member made of quartz. After diffusion, the layer of superconductive alloy should be less than 0.1 mm. thick. It is also conceivable to use a synthetic substance, for example nylon, for the basic member. Considerably lower temperature of about 150° C. must in this case be maintained while the applied components of the superconductive alloy are being diffused, and the duration of treatment must correspondingly be extended to about 1 to 2 hours. It is also advantageous to coat the superconductive surface layer externally with an insulating layer such as a synthetic film or a ceramic layer. Superconductors externally insulated in this manner may then if desired also be made up into cables.

The process according to the invention is not limited to the specific examples of embodiment described. On the contrary, metallic or non-metallic basic members of any external shape may be entirely or partially coated with other metals which are components of superconductive alloys and/or compounds, and diffused in, such components being for example the metals vanadium, tantalum, aluminum, indium, gallium or even germanium and silicon, and mixtures of these elements, and various steps of the process may be combined in suitable and expedient fashion.

I claim:

In the method of producing a magnetically hard superconductor member having a superficial superconductive layer established by two different components, the steps which comprise providing a basic carrier member of electrically conductive material, said carrier member being passive as regards any superconductive effect and whose surface is resistant to any diffusion effect with either of said superconductive components, applying said superconductive components to said diffusion-resistant surface in correlated spatially separated regions of said superconductive layer to be formed, and passing an electric current through said carrier member to heat said components and thereby effect a mutual diffusion thereof.

References Cited by the Examiner

UNITED STATES PATENTS

| | | | |
|---|---|---|---|
| 2,936,435 | 5/1960 | Buck. | |
| 3,056,889 | 10/1962 | Nyberg. | |
| 3,181,936 | 5/1965 | Denny. | |
| 3,191,055 | 6/1965 | Swihart. | |
| 3,218,693 | 11/1965 | Allen | 29—470 X |

JOHN F. CAMPBELL, *Primary Examiner.*

WILLIAM I. BROOKS, *Examiner.*